(12) United States Patent
Wu et al.

(10) Patent No.: US 7,947,417 B2
(45) Date of Patent: *May 24, 2011

(54) PROCESSES FOR THE PREPARATION OF HIGH SENSITIVITY TITANIUM PHTHALOCYANINES PHOTOGENERATING PIGMENTS

(75) Inventors: Jin Wu, Webster, NY (US); Liang-Bih Lin, Rochester, NY (US); Ah-Mee Hor, Mississauga (CA); Roger E. Gaynor, Oakville (CA); Justin F. Galloway, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 570 days.

This patent is subject to a terminal disclaimer.

(21) Appl. No.: 10/992,500

(22) Filed: Nov. 18, 2004

(65) Prior Publication Data

US 2006/0105254 A1    May 18, 2006

(51) Int. Cl.
*G03G 5/047*    (2006.01)

(52) U.S. Cl. .................. 430/59.5; 430/58.8; 430/78

(58) Field of Classification Search ............ 430/59.5, 430/58.8, 78
See application file for complete search history.

(56) References Cited

U.S. PATENT DOCUMENTS

| | | | |
|---|---|---|---|
| 4,265,990 A | 5/1981 | Stolka et al. | |
| 4,286,033 A | 8/1981 | Neyhart et al. | |
| 4,291,110 A | 9/1981 | Lee | |
| 4,338,387 A | 7/1982 | Hewitt | |
| 4,725,519 A * | 2/1988 | Suzuki et al. | 430/58.45 |
| 5,008,173 A * | 4/1991 | Mimura et al. | 430/78 |
| 5,091,278 A | 2/1992 | Teuscher et al. | |
| 5,114,815 A * | 5/1992 | Oda et al. | 430/59.5 |
| 5,153,094 A | 10/1992 | Kazmaier et al. | |
| 5,166,339 A | 11/1992 | Duff et al. | |
| 5,187,036 A * | 2/1993 | Matsui et al. | 430/58.4 |
| 5,189,155 A | 2/1993 | Mayo et al. | |
| 5,189,156 A | 2/1993 | Mayo et al. | |
| 5,206,359 A * | 4/1993 | Mayo et al. | 540/141 |
| 5,213,929 A * | 5/1993 | Takano et al. | 430/78 |
| 5,215,840 A * | 6/1993 | Itami et al. | 430/59.5 |
| 5,227,271 A * | 7/1993 | Kikuchi et al. | 430/58.65 |
| 5,252,417 A * | 10/1993 | Tokida et al. | 430/58.05 |
| 5,288,574 A | 2/1994 | Desllets et al. | |
| 5,298,617 A * | 3/1994 | Nukada et al. | 540/141 |
| 5,334,478 A | 8/1994 | Desllets et al. | |

(Continued)

FOREIGN PATENT DOCUMENTS

EP    0 409 737 A1    1/1991

(Continued)

OTHER PUBLICATIONS

U.S. Appl. No. 11/138,433.*

(Continued)

*Primary Examiner* — Hoa V Le
(74) *Attorney, Agent, or Firm* — Fay Sharpe LLP

(57) ABSTRACT

A process for preparing a high sensitivity titanyl phthalocyanine (TiOPc) pigment includes dissolving a Type I TiOPc in a suitable solvent, precipitating an intermediate TiOPc pigment by quenching the solution comprising the dissolved Type I TiOPc in a solvent system comprising an alcohol and alkylene chloride such as, for example, methylene chloride, and treating the intermediate TiOPc pigment with monochlorobenzene. The resultant TiOPc pigment, which is designated as a Type V TiOPc, is suitable for use as a charge generating material in a photoreceptor of an imaging device.

12 Claims, 6 Drawing Sheets

U.S. PATENT DOCUMENTS

| | | | |
|---|---|---|---|
| 5,350,844 A * | 9/1994 | Martin et al. | 540/141 |
| 5,378,569 A * | 1/1995 | Nukada et al. | 430/59.5 |
| 5,418,107 A * | 5/1995 | Nealey et al. | 430/132 |
| 5,473,064 A | 12/1995 | Mayo et al. | |
| 5,512,674 A * | 4/1996 | Nukada et al. | 540/141 |
| 5,567,559 A * | 10/1996 | Yang et al. | 430/59.5 |
| 5,648,542 A * | 7/1997 | Goodbrand et al. | 564/405 |
| 5,972,551 A * | 10/1999 | Miyauchi et al. | 430/78 |
| 6,210,847 B1 * | 4/2001 | Miyauchi et al. | 430/58.4 |
| 6,225,015 B1 * | 5/2001 | Okaji et al. | 430/78 |
| 6,228,547 B1 * | 5/2001 | Kobayashi et al. | 430/72 |
| 6,268,096 B1 * | 7/2001 | Nukada et al. | 430/78 |
| 6,291,120 B1 * | 9/2001 | Nishigaki et al. | 430/58.15 |
| 6,322,940 B1 * | 11/2001 | Nishigaki et al. | 430/58.65 |
| 6,376,141 B1 | 4/2002 | Mishra et al. | |
| 6,544,701 B2 | 4/2003 | Tadokoro et al. | |
| 6,558,863 B2 * | 5/2003 | Rokutanzono et al. | 430/58.7 |
| 6,569,587 B2 * | 5/2003 | Sasaki et al. | 430/78 |
| 6,576,399 B1 * | 6/2003 | Gries et al. | 430/272.1 |
| 6,713,220 B2 | 3/2004 | Graham et al. | |
| 7,029,810 B2 * | 4/2006 | Toda et al. | 430/58.7 |
| 7,057,034 B2 * | 6/2006 | Hamasaki et al. | 540/141 |
| 2002/0007056 A1 * | 1/2002 | Shimada et al. | 540/124 |
| 2003/0073015 A1 * | 4/2003 | Tamoto et al. | 430/66 |
| 2003/0148202 A1 * | 8/2003 | Matsumura et al. | 430/108.1 |
| 2003/0175611 A1 * | 9/2003 | Fujii et al. | 430/124 |
| 2003/0206754 A1 * | 11/2003 | Morita et al. | 399/299 |
| 2003/0235769 A1 * | 12/2003 | Zhu et al. | 430/56 |
| 2004/0033428 A1 * | 2/2004 | Niimi | 430/59.5 |
| 2004/0048177 A1 * | 3/2004 | Tamoto et al. | 430/58.2 |
| 2004/0053149 A1 * | 3/2004 | Toda et al. | 430/58.7 |
| 2004/0076898 A1 * | 4/2004 | Tamura | 430/59.5 |
| 2004/0120730 A1 * | 6/2004 | Niimi et al. | 399/159 |
| 2004/0152000 A1 * | 8/2004 | Zhu et al. | 430/59.5 |
| 2004/0214101 A1 * | 10/2004 | Suzuki | 430/59.2 |
| 2005/0069797 A1 * | 3/2005 | Niimi et al. | 430/78 |
| 2006/0269856 A1 * | 11/2006 | Wu et al. | 430/59.4 |
| 2007/0298341 A1 * | 12/2007 | Wu et al. | 430/58.8 |
| 2007/0298342 A1 * | 12/2007 | Wu et al. | 430/58.75 |
| 2008/0008948 A1 * | 1/2008 | Wu et al. | 430/58.8 |
| 2008/0008951 A1 * | 1/2008 | Wu et al. | 430/58.8 |
| 2008/0020306 A1 * | 1/2008 | Vong et al. | 430/58.8 |
| 2008/0020307 A1 * | 1/2008 | Vong et al. | 430/58.8 |
| 2009/0005555 A1 * | 1/2009 | Wu | 540/145 |

FOREIGN PATENT DOCUMENTS

| | | |
|---|---|---|
| EP | 0 460 565 A2 | 12/1991 |
| EP | 0 482 922 A1 | 4/1992 |
| EP | 0 508 772 A1 | 10/1992 |
| EP | 0 516 433 A2 | 12/1992 |
| EP | 0 560 311 A1 | 9/1993 |
| EP | 0 810 267 A2 | 12/1997 |
| EP | 1 093 025 A2 | 4/2001 |
| GB | 2322866 * | 9/1998 |
| WO | WO 99/45074 | 9/1999 |

OTHER PUBLICATIONS

U.S. Appl. No. 11/472,765.*
U.S. Appl. No. 11/472,766.*
U.S. Appl. No. 11/512,779.*
U.S. Appl. No. 11/512,841.*
U.S. Appl. No. 11/602,033.*
European Search Report issued Apr. 27, 2006.

* cited by examiner

PROCESSES FOR THE PREPARATION OF HIGH SENSITIVITY TITANIUM PHTHALOCYANINES PHOTOGENERATING PIGMENTS

BACKGROUND

Illustrated herein, in various exemplary embodiments, are processes for preparing high sensitivity titanyl phthalocyanine pigments and the phthalocyanine pigments produced or formed by such processes. The phthalocyanine pigments prepared by the processes disclosure are suitable for use as a photogenerating pigment in a photoimaging device and will be described with particular reference thereto. However, it is to be appreciated that the processes for preparing high sensitivity phthalocyanine pigments and the pigments formed thereby are also amenable to other similar applications.

In the art of electrophotography, an electrophotographic plate comprising a photoconductive insulating layer on a conductive layer is imaged by first uniformly electrostatically charging the imaging surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided electroscopic toner particles on the surface of the photoconductive insulating layer. The resulting visible toner image can be transferred to a suitable receiving member such as paper. This imaging process may be repeated many times with reusable electrophotographic imaging members.

The electrophotographic imaging members may be in the form of plates, drums or flexible belts. These electrophotographic members are usually multilayered photoreceptors that comprise a substrate, a conductive layer, an optional hole blocking layer, an optional adhesive layer, a charge generating layer, a charge transport layer, an optional overcoating layer and, in some belt embodiments, an anticurl backing layer. One type of multilayered photoreceptor comprises a layer of finely divided particles of a photoconductive inorganic compound dispersed in an electrically insulating organic resin binder. In U.S. Pat. No. 4,265,990 a layered photoreceptor is disclosed having separate charge generating (photogenerating) sections and charge transport layers. The charge generation section is capable of photogenerating holes and injecting the photogenerated holes into the charge transport layer.

The charge generating section utilized in multilayered photoreceptors include, for example, inorganic photoconductive particles or organic photoconductive particles dispersed in a film forming polymeric binder. Inorganic or organic photoconductive material may be formed as a continuous, homogeneous charge generation section. Many suitable photogenerating materials known in the art may be utilized, if desired.

Electrophotographic imaging members or photoreceptors having varying and unique properties are needed to satisfy the vast demands of the xerographic industry. The use of organic photogenerating pigments such as perylenes, bisazos, F perinones, and polycyclic quinones in electrophotographic applications is well known. Generally, layered imaging members with the aforementioned pigments exhibit acceptable photosensitivity in the visible region of the light spectrum, and hence they are particularly suitable for use in electrophotographic processes where visible light sources such as tungsten, fluorescent, and xenon lamps are used.

However, these classes of pigments in many instances have low or negligible photosensitivity in the near infrared region of the spectrum, for example between about 750 and 970 nanometers, thereby preventing their selection for photoresponsive imaging members in electronic printers wherein electronic light emitting devices, such as GaAs diode lasers, are commonly used as a light source to create an electrostatic image on the imaging members. Also, some of the above mentioned organic pigments have a narrow and restricted spectral response range such that they cannot reproduce certain colors present in the original documents, thus resulting in inferior copy quality.

To satisfy these demands, photoreceptors with different charge generation section formulations providing varying photosensitivities may be utilized. Charge generation sections are often formed by layering a dispersion of photoconductive pigments on to the photoreceptor. The cost to develop different photoconductive pigments and different charge generation section coating dispersion formulations and to change dispersion solutions for different products in the manufacturing process greatly increases the costs to manufacture photoreceptors.

The process of making a photoreceptor using dispersions is strongly susceptible to many variables, such as, for example, materials variables, including contents and purity of the material; process variables, including milling time and milling procedure; and coating process variables, including web coating, dip coating, the drying process of several layers, the time interval between the coatings of successive layers etc. The net outcome of all these variables is that the electrical characteristics of photoreceptors may be inconsistent during the manufacturing process.

Sensitivity is a very important electrical characteristic of electrophotographic imaging members or photoreceptors. Sensitivity may be described in two aspects. The first aspect of sensitivity is spectral sensitivity, which refers to sensitivity as a function of wavelength. An increase in spectral sensitivity implies an appearance of sensitivity at a wavelength in which previously no sensitivity was detected. The second aspect of sensitivity, broadband sensitivity, is a change of sensitivity (e.g., an increase) at a particular wavelength previously exhibiting sensitivity, or a general increase of sensitivity encompassing all wavelengths previously exhibiting sensitivity. This second aspect of sensitivity may also be described as change of sensitivity, encompassing all wavelengths, with a broadband (white) light exposure. A common problem encountered in the manufacturing of photoreceptors is maintaining consistent spectral and broadband sensitivity from batch to batch.

Typically, flexible photoreceptor belts are fabricated by depositing the various layers of photoactive coatings onto long webs that are thereafter cut into sheets. The opposite ends of each photoreceptor sheet are overlapped and ultrasonically welded together to form an imaging belt. In order to increase throughput during the web coating operation, the webs to be coated have a width of twice the width of a final belt. After coating, the web is slit lengthwise and thereafter transversely cut into predetermined lengths to form photoreceptor sheets of precise dimensions that are eventually welded into belts. The web length in a coating run may be many thousands of feet long and the coating run may take more than an hour for each layer.

Various types of inorganic photoconductive pigments are known in the art, including pigments based on phthalocyanine. A variety of phthalocyanine-based pigments are suitable for use in photoimaging members, including metal-free phthalocyanines, copper, iron, and zinc phthalocyanines, chloroindium phthalocyanines, hydroxygallium phthalocyanines, titanium-based phthalocyanines, such as, for example, titanyl phthalocyanine, and compositions comprising combinations of the above pigments. U.S. Pat. No. 6,376,141, the entire disclosure of which is incorporated herein by reference, discusses various reference directed to compositions comprising combinations of phthalocyanine pigments and also discusses references directed to hydroxygallium phthalocyanine pigments. Additionally, for example, U.S. Pat. No. 6,713,220 describes a method of preparing a Type V hydroxygallium phthalocyanine.

Of particular interests are titanyl phthalocyanines. Titanyl phthalocyanines, or oxytitanium phthalocyanines, are suitable photogenerating pigments known to absorb near infrared light around 800 nanometers and have generally exhibited improved sensitivity compared to other pigments such as, for example, hydroxygallium phthalocyanine. Titanyl phthalocyanine is known to exhibit certain crystal phases or polymorphs. Generally, titanyl phthalocyanine is known to have five main crystal forms known as Types I, II, III, X, and IV. The various polymorphs of titanyl phthalocyanine have been demonstrated as suitable pigments in the charge or photogenerating layer of a photoimaging member or device. Various methods for preparing a titanyl phthalocyanine having a particular crystal phase have been demonstrated. For example, U.S. Pat. Nos. 5,189,155 and 5,189,156, the entire disclosures of which are incorporated herein by reference, discuss a number of prior methods for obtaining various polymorphs of titanyl phthalocyanine. Additionally, U.S. Pat. Nos. 5,189,155 and 5,189,156 are directed to processes for obtaining Type I, X, and IV phthalocyanines. U.S. Pat. No. 5,153,094, the entire disclosure of which is incorporated herein by reference, relates to the preparation of titanyl phthalocyanine polymorphs including Type I, II, III, and IV polymorphs. U.S. Pat. No. 5,166,339, the entire disclosure of which is incorporated herein by reference, discloses processes for preparing Type I, IV, and X titanyl phthalocyanine polymorphs, as well as the preparation of two polymorphs designated as Type Z-1 and Type Z-2.

To obtain a titanyl phthalocyanine-based photoreceptor having high sensitivity to near infrared light, it is believed necessary to control not only the purity and chemical structure of the pigment, as is generally the situation with organic photoconductors, but also to prepare the pigment in the correct crystal modification. Consequently, it is still desirable to provide a process for preparing titanyl phthalocyanines that will provide high sensitivity titanyl phthalocyanines.

BRIEF DESCRIPTION

In accordance with one exemplary embodiment, a process for the preparation of a Type V titanyl phthalocyanine comprises providing a Type I titanyl phthalocyanine; dissolving said Type I titanyl phthalocyanine in a solution comprising a trihaloacetic acid and an alkylene halide; adding said mixture comprising the dissolved Type I titanyl phthalocyanine to a solution comprising an alcohol and an alkylene halide thereby precipitating a Type Y titanyl phthalocyanine; and treating said Type Y titanyl phthalocyanine with monochlorobenzene to yield a Type V titanyl phthalocyanine.

In accordance with another exemplary embodiment, a process for the preparation of Type V titanyl phthalocyanine comprises dissolving a Type I titanyl phthalocyanine in a solution of trifluoroacetic acid and methylene chloride; precipitating a Type Y titanyl phthalocyanine by adding said solution of trifluoroacetic acid, methylene chloride and the Type I titanyl phthalocyanine to a solution of methanol and methylene chloride; washing said Type Y titanyl phthalocyanine; and converting the Type Y titanyl phthalocyanine to a Type V titanyl phthalocyanine by treating said Type Y titanyl phthalocyanine with monochlorobenzene.

In accordance with yet another exemplary embodiment, a photoimaging member for an electrostatographic or xerographic process is provided. The photoimaging member comprises a substrate; a charge generation layer comprising a Type V titanyl phthalocyanine pigment; and a charge transport layer; wherein said photoimaging member exhibits a sensitivity of at least about $-550$ $Vcm^2/erg$ (with 30 μm charge transport layer).

DETAILED DESCRIPTION

Figure 1:
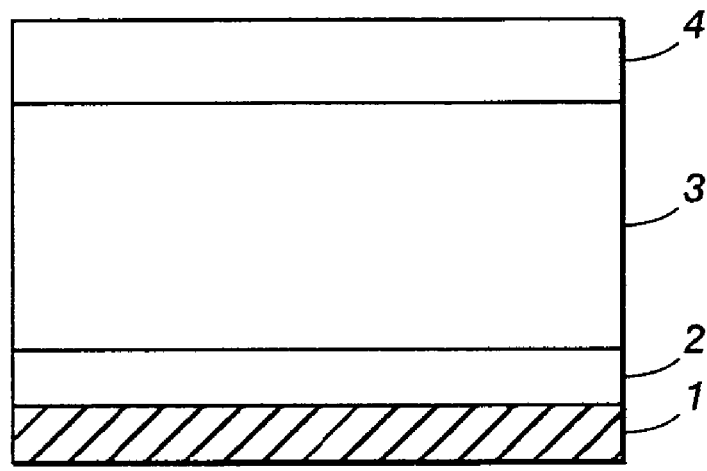
FIG. 1 is a schematic cross-sectional view of a negatively charged photo responsive imaging member comprising a titanyl phthalocyanine of one embodiment of the present disclosure.

The present disclosure relates to processes for preparing a high sensitivity titanyl phthalocyanine pigments and pigments produced by such processes. The pigments produced by the processes exhibit a crystal phase that is distinguishable from other known titanyl phthalocyanine polymorphs, and are designated as Type V polymorphs. The processes generally comprise converting a Type I titanyl phthalocyanine to a Type V phthalocyanine pigment. The processes include converting a Type I titanyl phthalocyanine to an intermediate phthalocyanine, which is designated as a Type Y phthalocyanine, and then subsequently converting the Type Y phthalocyanine to a Type V titanyl phthalocyanine.

In one embodiment, a process for preparing a high sensitivity titanyl phthalocyanine pigment is illustrated. The process comprises: (a) dissolving a Type I titanyl phthalocyanine in a suitable solvent; (b) adding the solvent solution comprising the dissolved Type I titanyl phthalocyanine to a quenching solvent system to precipitate an intermediate titanyl phthalocyanine (designated as a Type Y titanyl phthalocyanine); and (c) treating the resultant Type Y phthalocyanine with a halo, such as, for example, monochlorobenzene to obtain a resultant high sensitivity titanyl phthalocyanine, which is designated herein as a Type V titanyl phthalocyanine. In another embodiment, prior to treating the Type Y phthalocyanine with a halo, such as monochlorobenzene, the Type Y titanyl phthalocyanine may be washed with various solvents including, for example, water, and/or methanol. The quenching solvents system to which the solution comprising the dissolved Type I titanyl phthalocyanine is added comprises a trihaloacetic acid and an alkylene halide.

The process further provides a titanyl phthalocyanine having a crystal phase distinguishable from other known titanyl phthalocyanines. The titanyl phthalocyanine prepared by a process according to the present disclosure, which is designated as a Type V titanyl phthalocyanine, is distinguishable from, for example, Type IV titanyl phthalocyanines, in that a Type V titanyl phthalocyanine exhibits an x-ray powder diffraction spectrum having four characteristic peaks at 9.0°, 9.6°, 24.0°, and 27.2°, while Type IV titanyl phthalocyanines typically exhibit only three characteristic peaks at 9.6°, 24.0°, and 27.2°.

Any Type I titanyl phthalocyanine may be employed as the starting material in the present process. Type I titanyl phthalocyanines suitable for use in the present process may be obtained by any suitable method. Examples of suitable methods for preparing Type I titanyl phthalocyanines include, but are not limited to, those disclosed in U.S. Pat. Nos. 5,153,094; 5,166,339; 5,189,155; and 5,189,156, the entire disclosures of which are incorporated herein by reference.

A Type I titanyl phthalocyanine may be prepared, in one embodiment by the reaction of $DI^3$ (1,3-diiminoisoindolene) and tetrabutoxide in the presence of 1-chloronaphthalene solvent, whereby there is obtained a crude Type I titanyl phthalocyanine, which is subsequently purified, up to about a 99.5 percent purity, by washing with, for example, dimethylformamide.

In another embodiment, for example, a Type I titanyl phthalocyanine can also be prepared by i) the addition of 1 part titanium tetrabutoxide to a stirred solution of from about 1 part to about 10 parts and, in embodiments, about 4 parts of 1,3-diiminoisoindolene; ii) relatively slow application of heat using an appropriate sized heating mantle at a rate of about 1 degree per minute to about 10 degrees per minute and, in embodiments, about 5 degrees per minute until refluxing occurs at a temperature of about 130 degrees to about 180 degrees (all temperatures are in Centigrade unless otherwise indicated); iii) removal and collection of the resulting distillate, which was shown by NMR spectroscopy to be butyl alcohol, in a dropwise fashion, using an appropriate apparatus such as a Claisen Head condenser, until the temperature of the reactants reaches from 190 degrees to about 230 degrees and, in embodiments, about 200 degrees; iv) continued stirring at said reflux temperature for a period of about ½ hour to about 8 hours and, in embodiments, about 2 hours; v) cooling of the reactants to a temperature of about 130 degrees to about 180 degrees, and, in embodiments about 160 degrees, by removal of the heat source; vi) filtration of the flask contents through, for example, an M-porosity (10 to 15 micron) sintered glass funnel which was preheated using a solvent which is capable of raising the temperature of said funnel to about 150 degrees, for example, boiling N,N-dimethylformamide in an amount sufficient to completely cover the bottom of the filter funnel so as to prevent blockage of said funnel; vii) washing the resulting purple solid by slurrying said solid in portions of boiling DMF either in the funnel or in a separate vessel in a ratio of about 1 to about 10, and preferably about 3 times the volume of the solid being washed, until the hot filtrate became light blue in color; viii) cooling and further washing the solid of impurities by slurrying said solid in portions of N,N-dimethylformamide at room temperature, about 25 degrees, approximately equivalent to about three times blue in color; ix) washing the solid of impurities by slurrying said solid in portions of an organic solvent, such as methanol, acetone, water and the like, and in this embodiment methanol, at room temperature (about 25 degrees) approximately equivalent to about three times the volume of the solid being washed, until the filtrate became light blue in color; x) oven drying the purple solid in the presence of a vacuum or in air at a temperature of from about 25 degrees to about 200 degrees, and, in embodiments at about 70 degrees, for a period of from about 2 hours to about 48 hours and, in embodiments for about 24 hours, thereby resulting in the isolation of a shiny purple solid which was identified as being Type I titanyl phthalocyanine by its X-ray powder diffraction trace.

In still another embodiment, a Type I titanyl phthalocyanine may be prepared by: (i1) reacting a $DI^3$ with a titanium tetra alkoxide such as, for example, titanium tetrabutoxide at a temperature of about 195° C. for about two hours; (ii) filtering the contents of the reaction to obtain a resulting solid; (iii) washing the solid with dimethylformamide (DMF); (iv) washing with four percent ammonium hydroxide; (v) washing with deionized water; (vi) washing with methanol; (vii) reslurrying the washes and filtering; and (viii) drying at about 70° C. under vacuum to obtain a Type I titanyl phthalocyanine.

In a process for preparing a high sensitivity phthalocyanine in accordance with the present disclosure, a Type I titanyl phthalocyanine is dissolved in a suitable solvent. In embodiments, a Type I titanyl phthalocyanine is dissolved in a solvent comprising a trihaloacetic acid and an alkylene halide. The alkylene halide comprises, in embodiments, from about one to about six carbon atoms. Generally, the trihaloacetic acid is not limited in any manner. An example of a suitable trihaloacetic acid includes, but is not limited to, trifluoroacetic acid. In one embodiment, the solvent for dissolving a Type I titanyl phthalocyanine comprises trifluoroacetic acid and methylene chloride. In embodiments, the trihaloacetic acid is present in an amount of from about one volume part to about 100 volume parts of the solvent and the alkylene halide is present in an amount of from about one volume part to about 100 volume parts of the solvent. In one embodiment, the solvent comprises methylene chloride and trifluoroacetic acid in a volume-to-volume ratio of about 4 to 1. The Type I titanyl phthalocyanine is dissolved in the solvent by stirring for an effective period of time such as, for example, for about 30 seconds to about 24 hours, at room temperature. In one embodiment, the Type I titanyl phthalocyanine is dissolved by stirring in the solvent for about one hour at room temperature (i.e., about 25° C.). The Type I titanyl phthalocyanine may be dissolved in the solvent in either air or in an inert atmosphere (e.g., argon or nitrogen).

In a process in accordance with the present disclosure, the Type I titanyl phthalocyanine is converted to an intermediate titanyl phthalocyanine form prior to conversion to the high sensitivity titanyl phthalocyanine pigment. As used herein, "intermediate" does not refer to the life span of the Type Y titanyl phthalocyanine, but rather is used to indicate that the Type Y titanyl phthalocyanine is a separate form prepared in the process prior to obtaining the final desired Type V titanyl phthalocyanine product. To obtain the intermediate form, which is designated as a Type Y titanyl phthalocyanine, the dissolved Type I titanyl phthalocyanine is added to a quenching system comprising an alkyl alcohol and alkylene chloride. Adding the dissolved Type I titanyl phthalocyanine to the quenching system causes the Type Y titanyl phthalocyanine to precipitate. Materials suitable as the alkyl alcohol component of the quenching system include, but are not limited to, methanol, ethanol, and the like. In embodiments, the alkylene chloride component of the quenching system comprises from about one to about six carbon atoms. In one embodiment, the quenching system comprises methanol and methylene chloride. The quenching system comprises an alkyl alcohol to alkylene chloride ratio of from about 1/4 to about 4/1 (v/v). In other embodiments, the ratio of alkyl alcohol to alkylene chloride is from about 1/1 to about 3/1 (v/v). In one embodiment, the quenching system comprises methanol and methylene chloride in a ratio of about 1/1 (v/v). In another embodiment, the quenching system comprises methanol and methylene chloride in a ratio of about 3/1 (v/v). In embodiments, the dissolved Type I titanyl phthalocyanine is added to the quenching system at a rate of from about 1 ml/min to about 100 ml/min, and the quenching system is maintained at a temperature of from about 0 to about −25° C. during quenching. In a further embodiment, the quenching system is maintained at a temperature of from about 0 to about −25° C. for a period of from about 0.1 hour to about 8 hours after addition of the dissolved Type I titanyl phthalocyanine solution.

Following precipitation of the Type Y titanyl phthalocyanine, the precipitates may be washed with any suitable solution, including, for example, methanol, cold deionized water, hot deionized water, and the like. Generally, washing the precipitate will also be accompanied by filtration. A wet cake containing Type Y titanyl phthalocyanine and water is obtained with water content varying from about 30 to about 70 weight percent of the wet cake.

A Type V titanyl phthalocyanine is obtained in a process in accordance with the present disclosure by treating the obtained intermediate Type Y titanyl phthalocyanine with a halo, such as, for example, monochlorobenzene. The Type Y titanyl phthalocyanine wet cake may be redispersed in monochlorobenzene, filtered and oven-dried at a temperature of from about 60 to about 85° C. to provide the resultant Type V titanyl phthalocyanine. The monochlorobenzene treatment may occur over a period of about one to about 24 hours. In one embodiment, the monochlorobenzene is carried out for a period of about five hours.

A titanyl phthalocyanine obtained by a process in accordance with the present disclosure, which is designated as a Type V titanyl phthalocyanine, exhibits an x-ray powder diffraction spectrum distinguishable from other known titanyl phthalocyanine polymorphs. A Type V titanyl phthalocyanine obtained a process in accordance with the present disclosure exhibits an x-ray diffraction spectrum having four characteristics peaks at 9.0°, 9.6°, 24.0°, and 27.2°. A titanyl phthalocyanine prepared by a process in accordance with the present disclosure may have a particle size of from about 10 nm to about 500 nm. Particle size may be controlled or affected by the quenching rate in adding the dissolved Type I titanyl phthalocyanine to the quenching system and the composition of the quenching system.

Type V titanyl phthalocyanine pigments prepared by a process according to the present disclosure are suitable for use as a photogenerating pigment in the charge generation layer of a photoreceptor for a xerographic or electrostatographic imaging device. The configuration of the photoimaging device is not limited in any manner and a titanyl phthalocyanine pigment prepared by a process according to the present disclosure may be used in any such device. Examples of suitable photoimaging members include, but are not limited to, the imaging members depicted in FIGS. 1 and 2.

With reference to FIG. 1, a negatively charged photoimaging member comprises a supporting substrate 1, a solution coating adhesive layer 2, a photogenerator 3 comprising a Type V titanyl phthalocyanine obtained via a process according to the present disclosure, and a charge transport layer 4.

Figure 2:
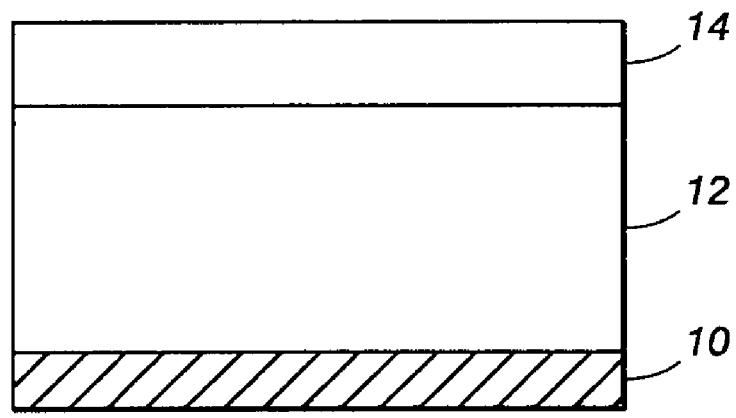
FIG. 2 is a schematic cross-sectional view of a positively charged photo responsive imaging member comprising a titanyl phthalocyanine according to another embodiment of the present disclosure.

With reference to FIG. 2, a positively charged photoimaging member comprises a substrate 10, a charge transport layer 12, and a photogenerator layer 14 comprising a titanyl phthalocyanine obtained via a process according to the present disclosure.

As indicated above, the photoreceptors are prepared by first providing a substrate, i.e., a support. The substrate can be opaque or substantially transparent and can comprise any of numerous suitable materials having given required mechanical properties.

The substrate can comprise a layer of electrically non-conductive material or a layer of electrically conductive material, such as an inorganic or organic composition. If a non-conductive material is employed, it is necessary to provide an electrically conductive ground plane over such non-conductive material. If a conductive material is used as the substrate, a separate ground plane layer may not be necessary.

The substrate can be flexible or rigid and can have any of a number of different configurations, such as, for example, a sheet, a scroll, an endless flexible belt, a web, a cylinder, and the like. The photoreceptor may be coated on a rigid, opaque, conducting substrate, such as an aluminum drum.

Various resins can be used as electrically non-conducting materials, including, but not limited to, polyesters, polycarbonates, polyamides, polyurethanes, and the like. Examples of suitable substrate materials include, but are not limited to, a commercially available biaxially oriented polyester known as MYLAR™, available from E. I. duPont de Nemours & Co., MELINEX™, available from ICI Americas Inc., or HOSTAPHAN™, available from American Hoechst Corporation. Other materials of which the substrate may be comprised include polymeric materials, such as polyvinyl fluoride, available as TEDLAR™ from E. I. duPont de Nemours & Co., polyethylene and polypropylene, available as MARLEX™ from Phillips Petroleum Company, polyphenylene sulfide, RYTON™ available from Phillips Petroleum Company, and polyimides, available as KAPTON™ from E. I. duPont de Nemours & Co. The photoreceptor can also be coated on an insulating plastic drum, provided a conducting ground plane has previously been coated on its surface, as described above. Such substrates can either be seamed or seamless.

When a conductive substrate is employed, any suitable conductive material can be used. For example, the conductive material can include, but is not limited to, metal flakes, powders or fibers, such as aluminum, titanium, nickel, chromium, brass, gold, stainless steel, carbon black, graphite, or the like, in a binder resin including metal oxides, sulfides, silicides, quaternary ammonium salt compositions, conductive polymers such as polyacetylene or its pyrolysis and molecular doped products, charge transfer complexes, and polyphenyl silane and molecular doped products from polyphenyl silane. A conducting plastic drum can be used, as well as the preferred conducting metal drum made from a material such as aluminum.

The thickness of the substrate depends on numerous factors, including the required mechanical performance and economic considerations. The thickness of the substrate is typically within a range of from about 65 micrometers to about 150 micrometers, and, in embodiments, is from about 75 micrometers to about 125 micrometers for optimum flexibility and minimum induced surface bending stress when cycled around small diameter rollers, e.g., 19 mm diameter rollers. The substrate for a flexible belt can be of substantial thickness, for example, over 200 micrometers, or of minimum thickness, for example, less than 50 micrometers, provided there are no adverse effects on the final photoconductive device. Where an aluminum drum is used, the thickness should be sufficient to provide the necessary rigidity. This is usually about 1-6 mm.

In embodiments, the surface of the substrate to which a layer is to be applied is cleaned to promote greater adhesion of such a layer. Cleaning can be effected, for example, by exposing the surface of the substrate layer to plasma discharge, ion bombardment, and the like. Other methods, such as solvent cleaning, can be used.

Regardless of any technique employed to form a metal layer, a thin layer of metal oxide generally forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

If a diffuse reflective surface is required, the surface of the substrate may be roughened by any known technique suitable to the particular material. Thus, for example, in the case of a rigid metal tube, typically of aluminum, the surface may be roughened by honing or sand blasting, i.e., bombarding with fine particles, or special lathing, chemical etching, anodizing and the like. If the substrate is prepared by electroforming, the roughness may be produced by proper electrochemical process conditions. If the substrate is a flexible polymeric film, the roughness can be produced by incorporating fillers that produce the desired roughness.

Alternatively, an anti-plywood diffuse light reflection function may be produced by a separate layer loaded with light scattering particles. This layer may be incorporated between the electrically conducting ground plane and the charge-blocking layer.

As stated above, photoreceptors prepared in accordance with the present disclosure comprise a substrate that is either electrically conductive or electrically non-conductive. When a non-conductive substrate is employed, an electrically conductive ground plane must be employed, and the ground plane acts as the conductive layer. When a conductive substrate is employed, the substrate can act as the conductive layer, although a conductive ground plane may also be provided.

If an electrically conductive ground plane is used, it is positioned over the substrate. Suitable materials for the electrically conductive ground plane include, but are not limited to, aluminum, zirconium, niobium, tantalum, vanadium, hafnium, titanium, nickel, stainless steel, chromium, tungsten, molybdenum, copper, and the like, and mixtures and alloys thereof. In embodiments, an electrically conductive ground plane comprises one of aluminum, titanium, and zirconium.

The ground plane can be applied by known coating techniques, such as solution coating, vapor deposition, and sputtering. An exemplary method of applying an electrically conductive ground plane is by vacuum deposition. Other suitable methods can also be used.

Suitable thicknesses of the ground plane are within a substantially wide range, depending on the optical transparency and flexibility desired for the electrophotoconductive member. Accordingly, for a flexible photoresponsive imaging device, the thickness of the conductive layer is, in one embodiment, between about 20 angstroms and about 750 angstroms, and, in another from about 50 angstroms to about 200 angstroms for an optimum combination of electrical conductivity, flexibility, and light transmission. However, the ground plane can, if desired, be opaque.

After deposition of any electrically conductive ground plane layer, an optional charge-blocking layer can be applied thereto. Electron blocking layers for positively charged photoreceptors permit holes from the imaging surface of the photoreceptor to migrate toward the conductive layer. For negatively charged photoreceptors, any suitable hole-blocking layer capable of forming a barrier to prevent hole injection from the conductive layer to the opposite photoconductive layer can be utilized.

If a blocking layer is employed, it is preferably positioned over the electrically conductive layer. The term "over," as used herein in connection with many different types of layers, should be understood as not being limited to instances wherein the layers are contiguous. Rather, the term refers to relative placement of the layers and encompasses the inclusion of unspecified intermediate layers.

The blocking layer can include polymers, such as polyvinyl butyral, epoxy resins, polyesters, polysiloxanes, polyamides, polyurethanes, and the like; nitrogen-containing siloxanes or nitrogen-containing titanium compounds, such as trimethoxysilyl propyl ethylene diamine, N-beta (aminoethyl) gamma-aminopropyl trimethoxy silane, isopropyl 4-aminobenzene sulfonyl titanate, di (dodecylbenzene sulfonyl) titanate, isopropyl di (4-aminobenzoyl) isostearoyl titanate, isopropyl tri (N-ethyl amino) titanate, isopropyl tri-anthranil titanate, isopropyl tri(N,N-dimethyl-ethyl amino) titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033, and 4,291,110.

An exemplary hole-blocking layer comprises a reaction product of a hydrolyzed silane or a mixture of hydrolyzed silanes and the oxidized surface of a metal ground plane layer. The oxidized surface inherently forms on the outer surface of most metal ground plane layers when exposed to air after deposition. This combination enhances electrical stability at low relative humidity. The hydrolyzed silanes can then be used as is well known in the art. For example, see U.S. Pat. No. 5,091,278 to Teuscher et al. The blocking layer should be continuous and can have a thickness of up to 2 micrometers depending on the type of material used. However, in embodiments, the blocking layer has a thickness of less than about 0.5 micrometer because greater thicknesses may lead to undesirably high residual voltage. A blocking layer between about 0.005 micrometer and about 0.3 micrometer is satisfactory for most applications because charge neutralization after the exposure step is facilitated and good electrical performance is achieved. A thickness between about 0.03 micrometer and about 0.06 micrometer is desirable for blocking layers for optimum electrical behavior.

The blocking layer can be applied by any suitable technique, such as spraying, dip coating, draw bar coating, gravure coating, silk screening, air knife coating, reverse roll coating, vacuum deposition, chemical treatment, and the like. For convenience in obtaining thin layers, the blocking layer is preferably applied in the form of a dilute solution, with the solvent being removed after deposition of the coating by conventional techniques, such as by vacuum, heating, and the like. Generally, a weight ratio of blocking layer material and solvent of between about 0.5:100 to about 5.0:100 is satisfactory for spray coating.

An optional intermediate layer between the blocking layer and the charge generating layer may, if desired, be provided to promote adhesion. However, in the present disclosure, a dip coated aluminum drum may be utilized without an adhesive layer.

Additionally, adhesive layers can be provided, if necessary, between any of the layers in the photoreceptors to ensure adhesion of any adjacent layers. Alternatively, or in addition, adhesive material can be incorporated into one or both of the respective layers to be adhered. Such optional adhesive layers may have thicknesses of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, for example, film-forming polymers, such as polyester, dupont 49,000 (available from E. I. duPont de Nemours & Co.), Vitel PE-100 (available from Goodyear Tire and Rubber Co.), polyvinyl butyral, polyvinyl pyrrolidone, polyurethane, polymethyl methacrylate, and the like.

In fabricating a photosensitive imaging member, a charge generating material (CGM) or pigment, herein the terms "pigment" and "charge generating material" are used interchangeably, and a charge transport material (CTM) may be deposited onto the substrate surface either in a laminate type configuration where the CGM and CTM are in different layers or in a single layer configuration where the CGM and CTM are in the same layer along with a binder resin. Photoreceptors in accordance with the present disclosure can be prepared by applying over the electrically conductive layer the charge generation layers and a charge transport layer. In embodiments, the charge generating layers and the charge transport layer may be applied in any order.

The charge generating layer comprises a high sensitivity titanyl phthalocyanine pigment (Type V) prepared by a process as previously described herein. The present Type V titanyl phthalocyanine pigments may be dispersed in a suitable resin binder. In embodiments, the Type V titanyl phthalocyanine pigment is present in dispersion in an amount of from about 35 to 75 weight percent, and the polymeric binder is present in an amount of from about 25 to 65 weight percent.

Any suitable resin binder material may be employed in the charge generating layer. Typical organic resinous binders include polycarbonates, acrylate polymers, methacrylate polymers, vinyl polymers, cellulose polymers, polyesters, polysiloxanes, polyamides, polyurethanes, epoxies, polyvinylacetals, polyvinylbutyrals, copolymers of vinyl chloride, vinyl acetate & maleic acid and the like.

In embodiments, the charge generating layer adjacent to the charge transporting layer be partially trapping to charge generated in the other charge generating layer(s) which are passing through this layer to the charge transporting layer. Normally, the above photoexcited charges are holes so the generation layer adjacent to the transport layer must be partially trapping to holes transiting through it, but if the transport layer transports electrons it would be electron trapping. This functionality can be in the pigment itself, that is, the pigment may be a good electron transporter but a poor hole transporter. Such pigments are sometimes referred to as extrinsic pigments because they require the presence of hole transport, i.e., electron donor, molecules. Examples of extrinsic electron transporting pigments are perylene and azo pigments and their derivatives. The degree of hole trapping can be controlled by introducing hole transport molecules either directly or by diffusion from the charge transport layer. Examples of charge transport materials are listed below. Alternatively or in combination, additives can be used to increase the charge trapping. Thus in case of ambipolar, also referred to as intrinsic, pigments such as phthalocyanines, trapping additives in combination with charge transport molecules can be added. Suitable additives are other charge transport materials whose energy levels are 0.2 eV different from the primary charge transport molecule.

Charge transport materials include an organic polymer or non-polymeric material capable of supporting the injection of photoexcited holes or transporting electrons from the photoconductive material and allowing the transport of these holes or electrons through the organic layer to selectively dissipate a surface charge. Illustrative charge transport materials include, for example, a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methylpyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly(vinylpyrene); poly(vinyltetraphene); poly(vinyltetracene) and poly(vinylperylene). Suitable electron transport materials include electron acceptors such as 2,4,7-trinitro-9-fluorenone; 2,4,5,7-tetranitro-fluorenone; dinitroanthracene; dinitroacridene; tetracyanopyrene and dinitroanthraquinone, biphenylquinone derivatives and phenylquinone derivatives.

Any suitable inactive resin binder with the desired mechanical properties may be employed in the charge transport layer. Typical inactive resin binders soluble in methylene chloride include polycarbonate resin, polyvinylcarbazole, polyester, polyarylate, polystyrene, polyacrylate, polyether, polysulfone, and the like. Molecular weights can vary from about 20,000 to about 1,500,000.

Any suitable technique may be utilized to apply the charge transport layer and the charge generating layers. Typical application techniques include spraying, dip coating, roll coating, wire wound rod coating, vacuum coating, and the like. Drying of the deposited coating may be effected by any suitable conventional technique such as oven drying, infrared radiation drying, air drying and the like. Generally, the thickness of each charge generating layer ranges from about 0.1 micrometer to about 3 micrometers and the thickness of the transport layer is between about 5 micrometers to about 100 micrometers, but thicknesses outside these ranges can also be used. The thickness of the charge generating layer adjacent to the charge transport layer is selected so that the required fraction of the charge is trapped resulting in the desired voltage. The desired thickness is then governed by the fraction of charge transiting the charge generating layer adjacent to the charge transport layer. In general, the ratio of the thickness of the charge transport layer to the charge generating layer is preferably maintained from about 2:1 to 200:1 and in some instances as great as 400:1.

The exemplary embodiments are further described with reference to the following examples. The examples are intended to be illustrative only and are not intended to limit the scope of the present disclosure in any manner.

Preparation of Titanyl Phthalocyanine Compositions

EXAMPLE I

Preparation of Type I Titanyl Phthalocyanine

A Type I titanyl phthalocyanine was prepared as follows: To a 300 milliliter three-necked flask fitted with mechanical stirrer, condenser and thermometer maintained under an argon atmosphere was added 3.6 grams (0.025 mole) of 1,3-diiminoisoindoline, 9.6 grams (0.075 mole) of o-phthalonitrile, 75 milliliters (80 weight percent) of N-methylpyrrolidone and 7.11 grams (0.025 mole) of titanium tetrapropoxide (all obtained from Aldrich Chemical Company except phthalonitrile which was obtained from BASF). The resulting mixture (20 weight percent of solids) was stirred and warmed to reflux (about 198° C.) for 2 hours. The resultant black suspension was cooled to about 150° C. and then was filtered by suction through a 350 milliliter, M-porosity sintered glass funnel, which had been preheated with boiling dimethyl foramide (DMF). The solid Type I TiOPc product resulting was washed with two 150-milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. and then with 50 milliliters of methanol. The resultant shiny purple solid was dried at 70° C. overnight to yield 10.9 grams (76 percent) of pigment, which was identified as Type I TiOPc on the basis of its X-ray powder diffraction trace. Elemental analysis of the product indicated C, 66.54; H, 2.60; N, 20.31; and Ash (TiO$_2$), 13.76. TiOPc requires (theory): C, 66.67; H, 2.80; N, 19.44; and Ash, 13.86.

A Type I titanyl phthalocyanine can also be prepared in 1-chloronaphthalene as follows: A 250 milliliter three-necked flask fitted with mechanical stirrer, condenser and thermometer maintained under an atmosphere of argon was charged with 1,3-diiminoisoindolene (14.5 grams), titanium tetrabutoxide (8.5 grams) and 75 milliliters of 1-chloronaphthalene (ClNp). The mixture was stirred and warmed. At 140° C. the mixture turned dark green and began to reflux. At this time the vapor (which was identified as n-butanol by gas chromatography) was allowed to escape to the atmosphere until the reflux temperature reached 200° C. The reaction was maintained at this temperature for two hours then was cooled to 150° C. The product was filtered through a 150 milliliter M-porosity sintered glass funnel, which was preheated to approximately 150° C. with boiling DMF, and then washed thoroughly with three portions of 150 milliliters of boiling DMF, followed by washing with three portions of 150 milliliters of DMF at room temperature, and then three portions of 50 milliliters of methanol, thus providing 10.3 grams (72 percent yield) of a shiny purple pigment, which was identified as Type I TiOPc by XRPD.

EXAMPLE II

Preparation of Type V Titanyl Phthalocyanine

Figure 3:
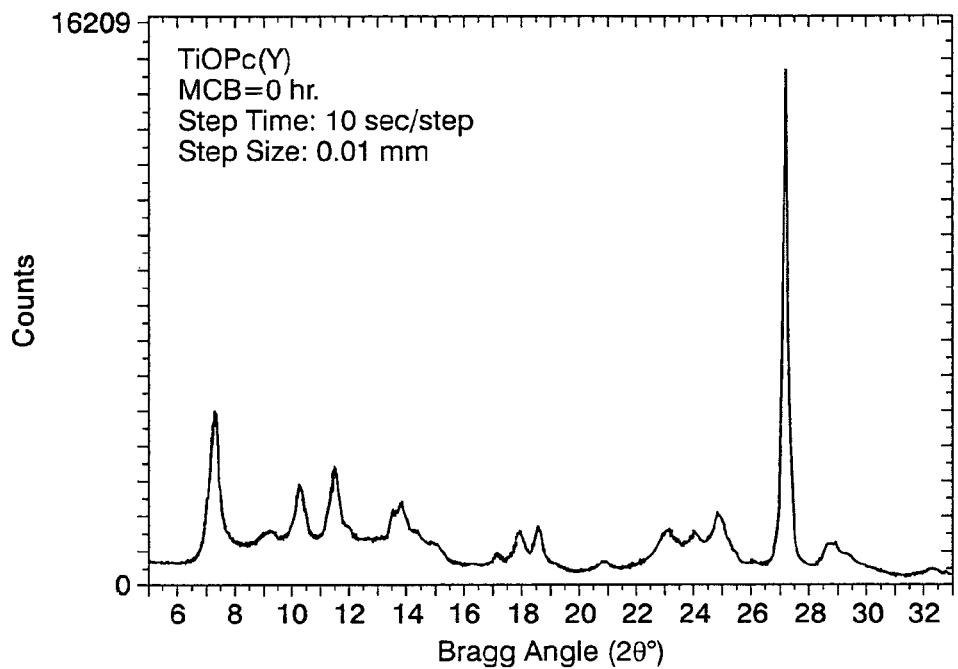
FIG. 3 is a diffractograph summary of an XRPD of a Type Y titanyl phthalocyanine.

Fifty grams of TiOPc Type I were dissolved in 300 milliliters of a trifluoroacetic acid/methylene chloride (1/4, volume/volume) mixture for 1 hour in a 500-milliliter Erlenmeyer flask with magnetic stirrer. At the same time, 2600 milliliters of methanol/methylene chloride (1/1, volume/volume) quenching mixture was cooled with a dry ice bath for 1 hour in a 3000 milliliter beaker with magnetic stirrer, and the final temperature of the mixture was about –25° C. The TiOPc solution was transferred to a 500-milliliter addition funnel with a pressure-equalization arm, and added into the cold quenching mixture over a period of 0.30 minutes. The mixture was then allowed to stir for an additional 30 minutes. The mixture was hose-vacuum filtered through a 2000-milliliter Buchner funnel with fibrous glass frit of 4-8 µm in porosity. The pigment was then well mixed with 1500 milliliters of methanol in the funnel, and vacuum filtered. The pigment was then well mixed with 1000 milliliters of hot water (>90° C.), and vacuum filtered in the funnel for four times. The pigment was then well mixed with 1500 milliliters of cold water, and vacuum filtered in the funnel. The final water filtrate was measured for conductivity, which was below 10 µS. The resulting wet cake contained approximately 50 weight percent of water. A small portion of the wet cake was dried at 65° C. under vacuum and a blue pigment was obtained. A representative XRPD of the TiOPc obtained after quenching with methanol/methylene chloride is depicted in FIG. 3. The XRPD of the TiOPc obtained after quenching in the methanol/methylene chloride mixture is designated as a Type Y titanyl phthalocyanine.

Figure 4:
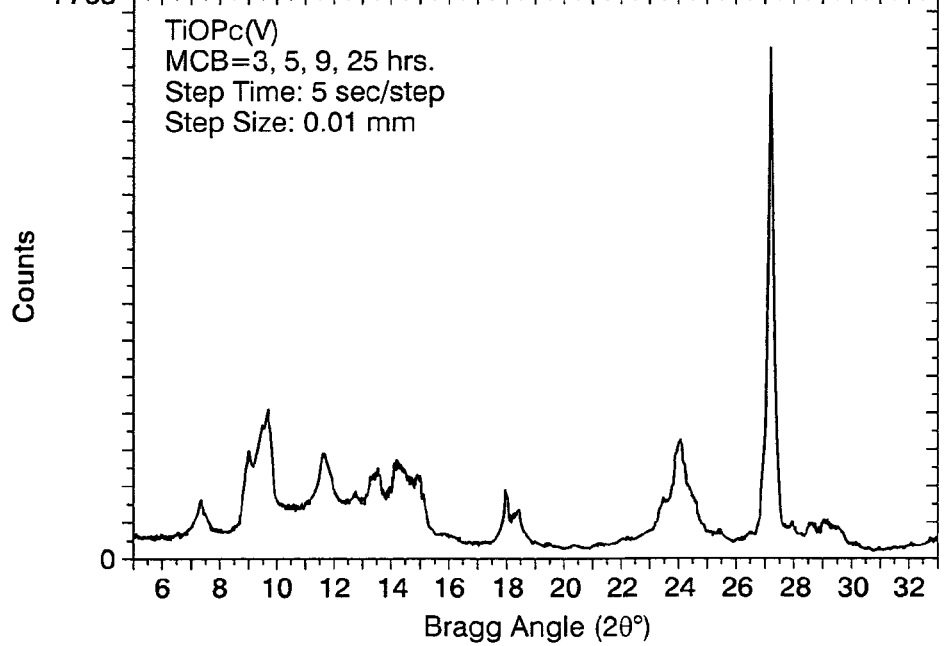
FIG. 4 is a diffractograph summary of an XRPD of a Type V titanyl phthalocyanine.

The remaining portion of the wet cake was re-dispersed in 700 grams of monochlorobenzene (MCB) in a 1000-milliliter bottle and rolled for an hour. The dispersion was vacuum filtered through a 2000-milliliter Buchner funnel with a fibrous glass frit of 4-8 µm in porosity over a period of two hours. The pigment was then well mixed with 1500 milliliters of methanol and filtered in the funnel for two times. The final pigment was vacuum dried at 60-65° C. for two days. Approximately 45 g of the pigment were obtained. A representative XRPD of the TiOPc after MCB conversion is depicted in FIG. 4. The XRPD of the TiOPc after the MCB conversion is designated as a Type V titanyl phthalocyanine.

EXAMPLE III

Preparation of a Type V Titanyl Phthalocyanine

Fifty grams of TiOPc Type I was dissolved in 300 milliliters of a trifluoroacetic acid/methylene chloride (1/4, volume/volume) mixture for 1 hour in a 500-milliliter Erlenmeyer flask with magnetic stirrer. At the same time, 2600 milliliters of a methanol/methylene chloride (3/1, volume/volume) quenching mixture was cooled with a dry ice bath for 1 hour in a 3000 milliliter beaker with magnetic stirrer, and the final temperature of the mixture was about –10° C. The TiOPc solution was transferred to a 500-milliliter addition funnel with a pressure-equalization arm, and added into the cold quenching mixture over a period of 60 minutes. The mixture was then allowed to stir for an additional 30 minutes. The mixture was hose-vacuum filtered through a 2000-milliliter Buchner funnel with a fibrous glass frit of 4-8 µm in porosity. The pigment was then well mixed with 1500 milliliters of methanol in the funnel and vacuum filtered. The pigment was then well mixed with 1000 milliliters of hot water (>90° C.) and vacuum filtered in the funnel for four times. The pigment was then well mixed with 1500 milliliters of cold water and vacuum filtered in the funnel. The final water filtrate was measured for conductivity, which was below 10 µS. The resulting wet cake contained approximately 50 weight percent of water. The wet cake was re-dispersed in 700 grams of monochlorobenzene (MCB) in a 1000-milliliter bottle and rolled for an hour. The dispersion was vacuum filtered through a 2000-milliliter Buchner funnel with fibrous glass frit of 4-8 µm in porosity over a period of two hours. The pigment was then well mixed with 1500 milliliters of methanol and filtered in the funnel for two times. The final pigment was vacuum dried at 60-65° C. for two days. Approximately 45 g of the pigment were obtained.

COMPARATIVE EXAMPLE I

Preparation of Type IV Titanyl Phthalocyanine

Five hundred grams of TiOPc Type I was dissolved in 5 liters of a 1/4 (volume/volume) mixture of trifluoroacetic acid and methylene chloride over a period of approximately 15 minutes. A 1/1 (v/v) methanol/water mixture (50 liters), which had been cooled overnight to about 0° C., was divided into three equal portions and placed in three plastic 5 gallon pails. The dissolved pigment solution was also devided into three equal portions and added dropwise to the chilled methanol/water over a period of 1 hour. The precipitated solid clung to the sides of the pails, allowing for removal of the solvents by simple decantation. The solid was then re-dispersed in methanol (50 liters), and filtered through a Buchner Funnel (600 centimeter diameter) fitted with a glass fiber filter paper, and then washed with approximately 50 liters of hot water (60-80° C.). The wet cake was then re-dispersed in monochlorobenzene (50 liters) and filtered as before. The washed pigment was then oven dried at 70° C. overnight to afford 455 grams (91% yield) of a powdery blue pigment, which was identified as Type IV titanyl phthalocyanine by XRPD (FIG. 6).

Figure 5:
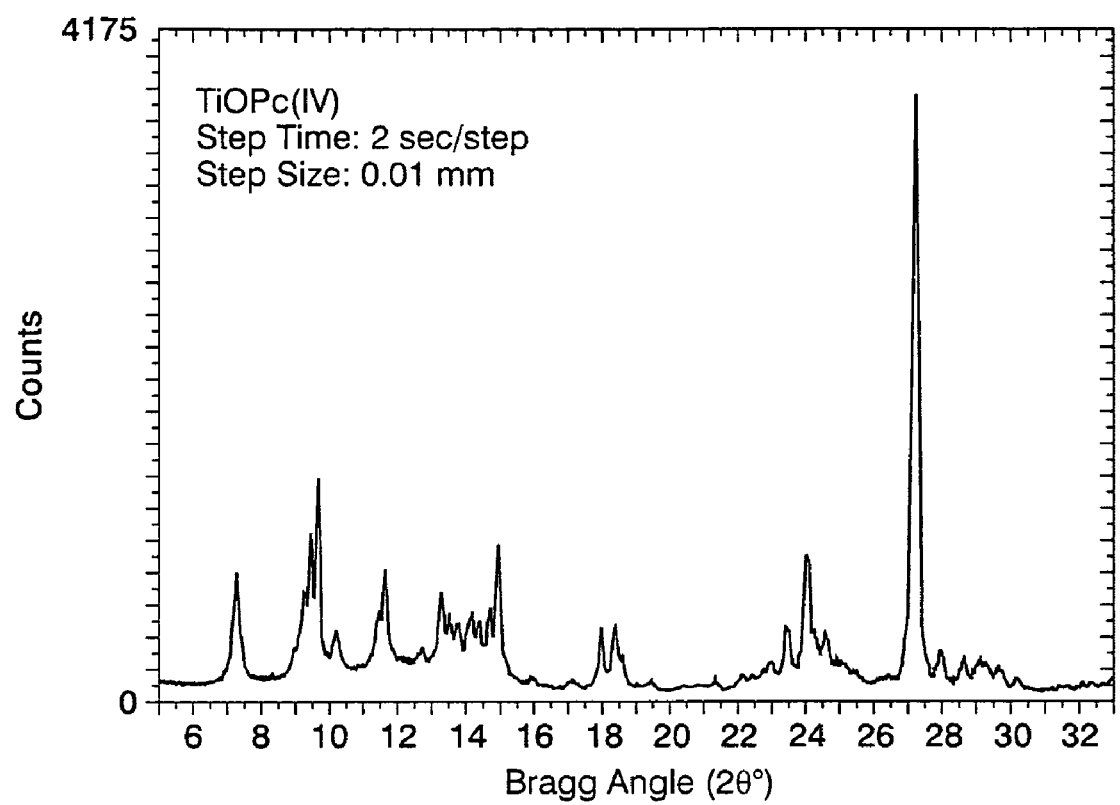
FIG. 5 is a diffractograph summary of an XRPD of a Type IV titanyl phthalocyanine of Comparative Example I.

FIG. 4 provides a XRPD spectrum for a Type V TiOPc pigment prepared by a process according to the present disclosure, and FIG. 5 provides a XRPD of the TiOPc pigment of Comparative Examples I. As shown in FIG. 4, a Type V TiOPc prepared by a process according to the present disclosure has four characteristic peaks at 9.0°, 9.6°, 24.0°, and 27.2° and is distinguishable from the Type IV TiOPc pigments (FIG. 5).

Figure 6:
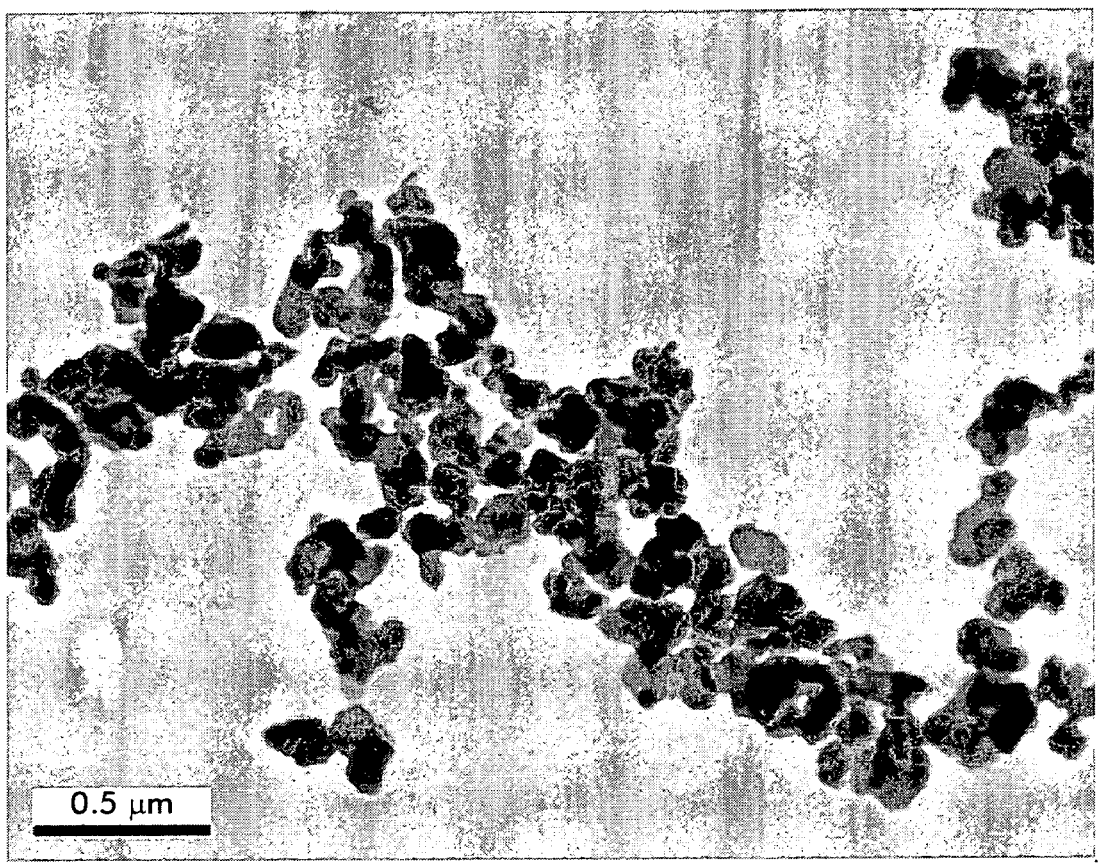
FIG. 6 is a TEM photograph of a Type V titanyl phthalocyanine prepared according to one embodiment of the present disclosure.
Figure 7:
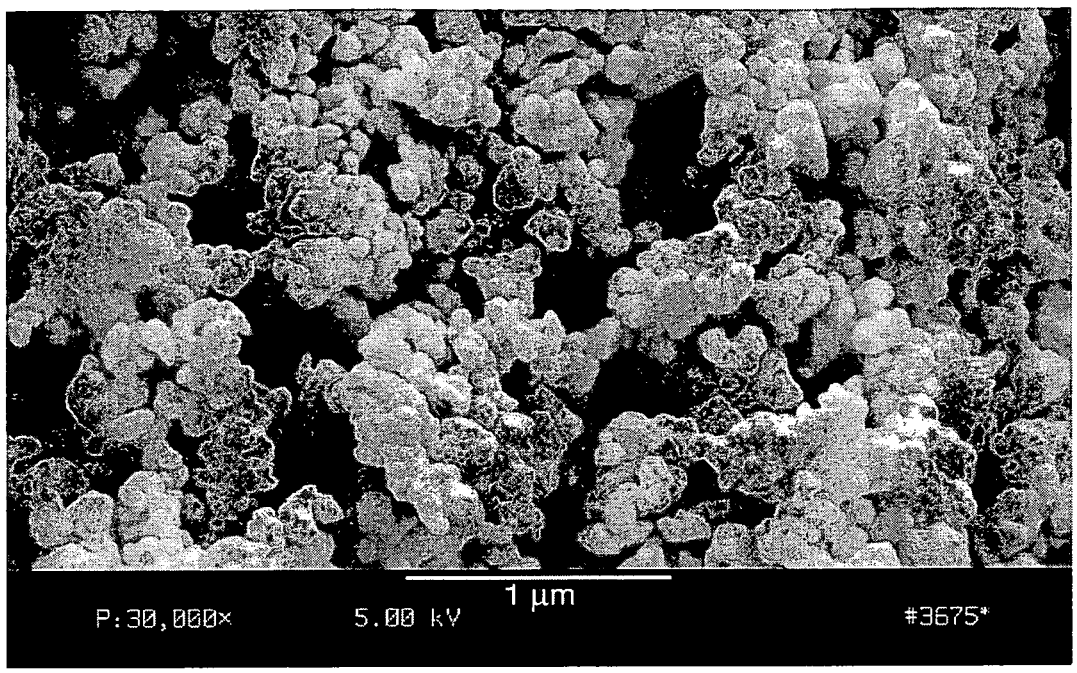
FIG. 7 is a SEM photograph of a Type V titanyl phthalocyanine prepared according to one embodiment of the present disclosure.
Figure 8:
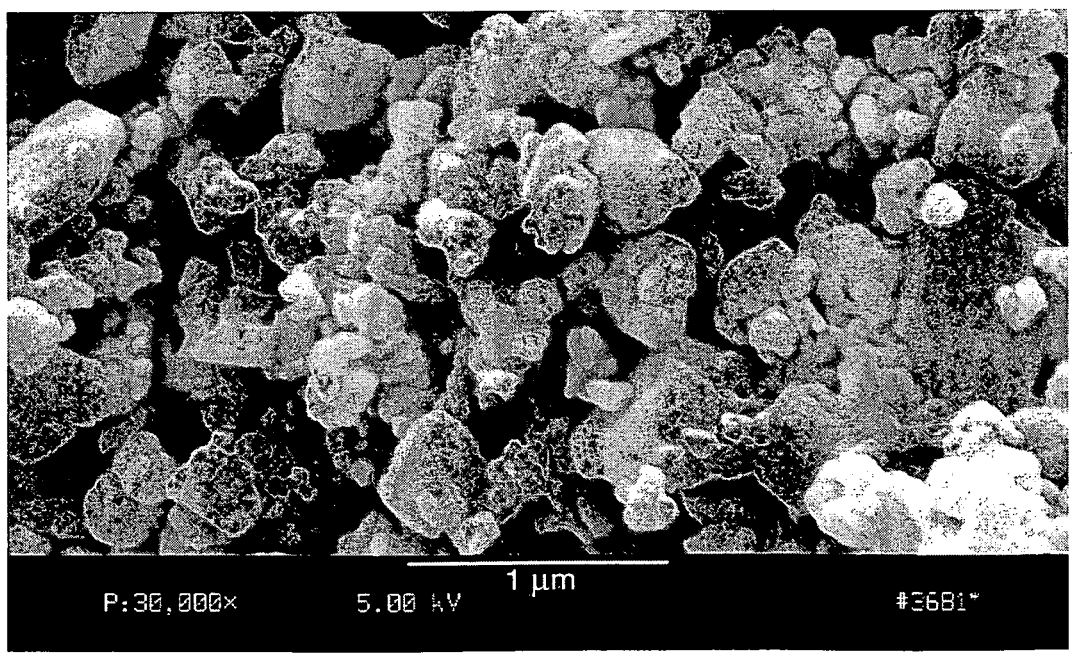
FIG. 8 is a SEM photograph of a Type IV titanyl phthalocyanine of Comparative Example I.

FIGS. 6-8 show TEM and SEM micrographs of a Type V TiOPc prepared by the process of Example II, and SEM micrography of a Type IV TiOPc prepared according to Comparative Example I. The Type V TiOPc exhibited a surface area of about 40 m$^2$/g as compared to 20 m$^2$/g for the TiOPc of Comparative Example I.

Figure 9:
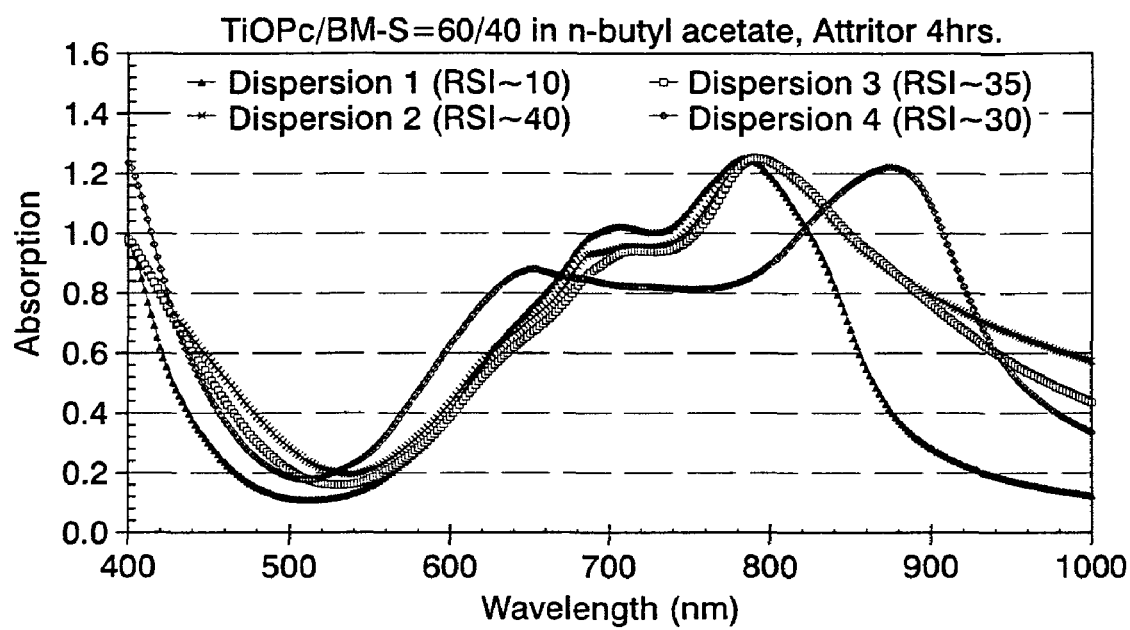
FIG. 9 is a UV spectrum of charge generating dispersions comprising titanyl phthalocyanine pigments.

The UV spectra of TiOPc dispersions were also examined. TiOPc dispersions were prepared comprising TiOPc pigments (10% solids in mill base) and a poly (vinyl butyral) BM-S polymeric binder in n-butyl acetate by milling the components for three hours using Attritor milling. The dispersions had a TiOPc/binder make up of 60/40 (weight/weight). Example V had a TiOPc made in accordance with Example II, Comparative Example II included a TiOPc made in accordance with Comparative Example I. The UV spectra of the dispersions are shown in FIG. 9.

Photoreceptor Devices

Several photoreceptor devices were prepared to compare the various electrical properties of different photogenerating pigments in a photoreceptor. In general, the photoreceptor devices comprised an undercoat layer, a charge generating layer, and a charge transport layer. The specific details of the devices are described with reference to the specific examples.

The following properties were measured in the various studies as follows: Sensitivity (S) is measured as the initial slope of a photoinduced discharge characteristic (PDIC) curve (in units of (volt cm$^2$/ergs)), and $V_{depl}$ is linearly extrapolated from the surface potential versus charge density relation of the device and is a measurement of voltage leak during charging. Dark decay ($V_{dd}$) is the lost potential before light exposure. In general, an ideal photoreceptor device should have higher sensitivity (S) while $V_{dd}$ and $V_{depl}$ should be close to zero.

All the devices were coated with a 3-component undercoat layer, varying TiOPc charge generating layer and 30 μm charge transport layer, respectively. The 3-component undercoat layer was prepared as follows: Zirconium acetylacetonate tributoxide (35.5 parts), γ-aminopropyltriethoxysilane (4.8 parts) and poly(vinyl butyral) BM-S (2.5 parts) were dissolved in n-butanol (52.2 parts). The coating solution was coated via a ring coater, and the layer was pre-heated at 59° C. for 13 minutes, humidified at 58° C. (dew point=54° C.) for 17 minutes, and then dried at 135° C. for 8 minutes. The thickness of the undercoat layer was approximately 1.3 μm. The TiOPc generating layer dispersions were prepared as described in the following examples, coated on top of 3-component undercoat layer. The thickness of the photogenerating layer was approximately 0.2 μm. Subsequently, a 30 μm charge transport layer (CTL) was coated on top of the photogenerating layer from a solution of N,N'-diphenyl-N,N-bis(3-methyl phenyl)-1,1'-biphenyl-4,4'-diamine (9.9 grams) and a polycarbonate, PCZ-400 [poly(4,4'-dihydroxy-diphenyl-1-1-cyclohexane, $M_w$=40000)] available from Mitsubishi Gas Chemical Co., Ltd. (12.1 grams), in a mixture of 55 grams of tetrahydrofuran (THF) and 23.5 grams of monochlorobenzene. The CTL was dried at 135 degrees Centigrade for 45 minutes.

EXAMPLE IV

Preparation of TiOPc Type Y Charge Generating Layer Coating Dispersion

Three grams of TiOPc Type Y (the intermediate pigment of Example II), 2 grams of poly(vinyl butyral) (BM-S) and 45 grams of n-butyl acetate was Attritor milled with 150 grams of 1.0-1.25 mm Glen Mills glass beads for 2 hours. The resulting dispersion was filtered through a 20 μm Nylon cloth filter, and diluted to 5 weight percent solid before coating.

EXAMPLE V

Preparation of TiOPc Type V Charge Generating Layer Coating Dispersion

Three grams of TiOPc Type V (Example II), 2 grams of poly(vinyl butyral) (BM-S) and 45 grams of n-butyl acetate was Attritor milled with 150 grams of 1.0-1.25 mm Glen Mills glass beads for 2 hours. The resulting dispersion was filtered through a 20 μm Nylon cloth filter, and diluted to 5 weight percent solid before coating.

EXAMPLE VI

Preparation of TiOPc Type V Charge Generating Layer Coating Dispersion

Three grams of TiOPc Type V (Example III), 2 grams of poly(vinyl butyral) (BM-S) and 45 grams of n-butyl acetate was Attritor milled with 150 grams of 1.0-1.25 mm Glen Mills glass beads for 2 hours. The resulting dispersion was filtered through a 20 μm Nylon cloth filter, and diluted to 5 weight percent solid before coating.

EXAMPLE VII

Preparation of TiOPc Type V Charge Generating Layer Coating Dispersion

Three grams of TiOPc Type V (Example II), 2 grams of a vinyl chloride/vinyl acetate copolymer (VMCH) ($M_n$=27000, about 86 weight percent of vinyl chloride, about 13 weight percent of vinyl acetate and about 1 weight percent of maleic acid) available from Dow Chemical and 45 grams of n-butyl acetate was Attritor milled with 150 grams of 1.0-1.25 mm Glen Mills glass beads for 2 hours. The resulting dispersion was filtered through a 20 μm Nylon cloth filter, and diluted to 5 weight percent solid before coating.

COMPARATIVE EXAMPLE II

Preparation of TiOPc Type IV Charge Generating Layer Coating Dispersion

Three grams of TiOPc Type IV (Comparative Example 1), 2 grams of poly(vinyl butyral) (BM-S) and 45 grams of n-butyl acetate was Attritor milled with 150 grams of 1.0-1.25 mm Glen Mills glass beads for 2 hours. The resulting dispersion was filtered through a 20 μm Nylon cloth filter, and diluted to 5 weight solid before coating.

The electrical performance was evaluated, and photo-induced discharge curves (PIDC) were obtained with a scanner speed of 61 rpm and a 122 ms delay after exposure with 780 nm light. The results are set forth in Table 1.

| Device | TiOPc charge generating layer | S (Vcm$^2$/erg) | $V_{depl}$ (V) | $V_{dd}$ (V) |
|---|---|---|---|---|
| 1 | Example IV | −500 | 200 | 85 |
| 2 | Example V | −615 | 20 | 10 |
| 3 | Example VI | −605 | 25 | 15 |
| 4 | Example VII | −625 | 30 | 17 |
| 5 | Comparative Example II | −490 | 30 | 15 |

Processes for preparing a high sensitivity titanyl phthalocyanine photogenerating pigment have been described with reference to various exemplary embodiments. Obviously, modifications and alterations will occur to others upon reading and understanding the preceding detailed description. It is intended that the exemplary embodiments construed as including all such modifications and alterations insofar as they come within the scope of the appended claims or equivalence thereof.

The invention claimed is:

1. A photoimaging member for an electrostatographic or xerographic process, the photoimaging member comprising:
    a substrate;
    a charge generation layer comprising a Type V titanyl phthalocyanine pigment; and
    a charge transport layer;
    wherein said photoimaging member exhibits a sensitivity of at least about −550 Vcm$^2$/erg when the charge transport layer has a thickness of 30 μm; and
    the Type V titanyl phthalocyanine is characterized by having an X-ray diffraction pattern that has a maximum peak at a Bragg angle(2θ°) of 27.2°, and additional peaks in decreasing order of intensity at Bragg angles of 9.6°, 24.0°, and 9.0°; and
    the Type V titanyl phthalocyanine has a particle size of from about 10 nm to about 500 nm.

2. The photoimaging member according to claim 1, wherein said charge transport layer comprises a polycarbonate resin and N,N'-diphenyl-N,N-bis(3-methyl phenyl)-1,1'-biphenyl-4,4'-diamine (mTBD).

3. The photoimaging member according to claim 1, wherein said Type V titanyl phthalocyanine pigment is prepared by dissolving a Type I titanyl phthalocyanine pigment in a solution comprising a trihaloacetic acid and an alkylene chloride, quenching the resultant solution in a quenching system comprising an alcohol and an alkylene halide to precipitate an intermediate titanyl phthalocyanine pigment, and treating said intermediate titanyl phthalocyanine with monochlorobenzene.

4. The photoimaging member according to claim 3, wherein the quenching system comprises the alcohol and alkylene halide in a (v/v) ratio of from about 1/4 to about 4/1.

5. The photoimaging member according to claim 3, wherein said quenching system comprises methanol and methylene chloride.

6. The photoimaging member according to claim 1, wherein said charge generating layer comprises a Type V titanyl phthalocyanine and a polymeric binder in a ratio of from about 50/50 to about 70/30.

7. The photoimaging member according to claim 1, wherein the charge generating layer comprises a Type V titanyl phthalocyanine and a polymeric binder in a ratio of from about 50/50 to about 70/30, and the charge transport layer comprises a polymeric binder and a hole transport material.

8. The photoimaging member according to claim 7, wherein said hole transport material is N,N'-diphenyl-N,N-bis(3-methyl phenyl)-1,1'-biphenyl-4,4'-diamine (mTBD).

9. The photoimaging member according to claim 3, wherein the solution comprising the trihaloacetic acid, alkylene chloride, and dissolved Type I titanyl phthalocyanine is added to the quenching system at a rate of about 1 ml/min to about 100 ml/min.

10. The photoimaging member according to claim 3, wherein said quenching system is maintained at a temperature of from about 0 to about −25° C.

11. The photoimaging member according to claim 3, wherein said intermediate titanyl phthalocyanine is treated with monochlorobenzene over a period of about 1 to about 24 hours.

12. The photoimaging member according to claim 3, wherein said intermediate titanyl phthalocyanine is treated with monochlorobenzene over a period of about 5 hours.

* * * * *